US012626671B2

(12) United States Patent
Crounse et al.

(10) Patent No.: US 12,626,671 B2
(45) Date of Patent: May 12, 2026

(54) METHODS FOR PRODUCING FULL-COLOR E-PAPER IMAGES WITH LOW GRAIN

(71) Applicant: E INK CORPORATION, Billerica, MA (US)

(72) Inventors: Kenneth R Crounse, Somerville, MA (US); Amit Deliwala, Andover, MA (US); Hjalmar Edzer Ayco Huitema, Lexington, MA (US); Stephen J. Telfer, Arlington, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 19/035,362

(22) Filed: Jan. 23, 2025

(65) Prior Publication Data

US 2025/0239232 A1     Jul. 24, 2025

Related U.S. Application Data

(60) Provisional application No. 63/624,778, filed on Jan. 24, 2024.

(51) Int. Cl.
G09G 3/34 (2006.01)
G02F 1/167 (2019.01)

(52) U.S. Cl.
CPC .............. G09G 3/344 (2013.01); G02F 1/167 (2013.01); G09G 2320/0242 (2013.01)

(58) Field of Classification Search
CPC .......... G09G 3/344; G09G 2320/0271; G09G 3/2003; G09G 2340/00
See application file for complete search history.

(56) References Cited

U.S. PATENT DOCUMENTS

| | | | |
|---|---|---|---|
| 8,593,396 B2 | 11/2013 | Amundson et al. | |
| 8,717,280 B2 | 5/2014 | de Zeeuw | |
| 9,530,363 B2 | 12/2016 | Ben-Dov et al. | |
| 2012/0146975 A1* | 6/2012 | de Zeeuw | G09G 3/344 |
| | | | 345/107 |
| 2016/0091770 A1* | 3/2016 | Bouchard | G09G 3/344 |
| | | | 359/296 |
| 2016/0180777 A1* | 6/2016 | Lin | G09G 3/344 |
| | | | 345/107 |

OTHER PUBLICATIONS

European Patent Office, "International Search Report and Written Opinion", PCT/US2025/012784, Mar. 14, 2025.

* cited by examiner

*Primary Examiner* — Temesghen Ghebretinsae
(74) *Attorney, Agent, or Firm* — Brian D. Bean

(57) ABSTRACT

Improved methods for driving color electro-optic displays, such as electrophoretic displays with multi-particle electrophoretic media. When driving between a first image having a high color depth (i.e., greater than 64 distinct colors) and a second image having a high color depth, the data processing load can be reduced by mapping the set of colors in the first image to a reduced color set. In a preferred embodiment, the electro-optic medium is an electrophoretic medium that includes a white particle and cyan, yellow, and magenta subtractive primary-colored particles. Images with high color depth look less grainy and are more appealing to consumers.

13 Claims, 10 Drawing Sheets
(3 of 10 Drawing Sheet(s) Filed in Color)

VIEWING SURFACE

| | | | | | | | |
|---|---|---|---|---|---|---|---|
| | | | | Cyan | | | |
| | | | Magenta | Yellow | Magenta | | |
| | Magenta | Cyan | Cyan | Magenta | Cyan | | |
| Yellow | Yellow | Magenta | White | White | White | Yellow | Magenta |
| White | White | White | Yellow | Yellow | Magenta | Cyan | Yellow |
| Cyan | Cyan | Cyan | | | Magenta | White | White |
| Magenta | Magenta | Yellow | | | Yellow | | |
| Yellow | | | | | | | |

NON-VIEWING SURFACE

| White | Yellow | Red | Magenta | Blue | Cyan | Green | Black |
|---|---|---|---|---|---|---|---|
| [A] | [B] | [C] | [D] | [E] | [F] | [G] | [H] |

WCMY

Fig. 5

Volume element of prior state colors maps to single color

L*=100

L*=0

+a

-a

+b

-b

METHODS FOR PRODUCING FULL-COLOR E-PAPER IMAGES WITH LOW GRAIN

RELATED APPLICATIONS

This application claims priority to U.S. Provisional Application No. 63/624,778, filed Jan. 24, 2024. All patents and publications disclosed herein are incorporated by reference in their entireties.

BACKGROUND

An electrophoretic display (EPD) changes color by modifying the position of one or more charged colored particles with respect to a light-transmissive viewing surface. Such electrophoretic displays are typically referred to as "electronic paper" or "ePaper" because the resulting display has high contrast and is sunlight-readable, much like ink on paper. Electrophoretic displays have enjoyed widespread adoption in eReaders because the electrophoretic displays provide a book-like reading experience, use little power, and allow a user to carry a library of hundreds of books in a lightweight handheld device. Such devices are increasingly being adapted to display of out-of-home (OOH) digital content, such as shelf labels, outdoor advertisement and transportation signage.

For many years, electrophoretic displays included only two types of charged color particles, black and white. (To be sure, "color" as used herein includes black and white.) The white particles are often of the light scattering type, and comprise, e.g., titanium dioxide, while the black particles are absorptive across the visible spectrum, and may comprise carbon black, or an absorptive metal oxide, such as copper chromite. In the simplest sense, a black and white electrophoretic display only requires a light-transmissive electrode at the viewing surface, a back electrode, and an electrophoretic medium including oppositely charged white and black particles. When a voltage of one polarity is provided, the white particles move to the viewing surface, and when a voltage of the opposite polarity is provided the black particles move to the viewing surface. If the back electrode includes controllable regions (pixels)—either segmented electrodes or an active matrix of pixel electrodes controlled by transistors—a pattern can be made to appear electronically at the viewing surface. The pattern can be, for example, the text to a book.

More recently, a variety of color option have become commercially available for electrophoretic displays, including three-color displays (black, white, red; black, white, yellow), and four color displays (black, white, red, yellow). Similar to the operation of black and white electrophoretic displays, electrophoretic displays with three or four reflective pigments operate similar to the simple black and white displays because the desired color particle is driven to the viewing surface. The driving schemes are far more complicated than only black and white, but in the end, the optical function of the particles is the same.

Advanced Color electronic Paper (ACeP™) also includes four particles, but the cyan, yellow, and magenta particles are subtractive rather than reflective, thereby allowing thousands of colors to be produced at each pixel. The color process is functionally equivalent to the printing methods that have long been used in offset printing and ink-jet printers. A given color is produced by using the correct ratio of cyan, yellow, and magenta on a bright white paper background. In the instance of ACeP, the relative positions of the cyan, yellow, magenta and white particles with respect to the viewing surface will determine the color at each pixel. While this type of electrophoretic display allows for thousands of colors at each pixel, it is critical to carefully control the position of each of the (50 to 500 nanometer-sized) pigments within a working space of about 10 to 20 micrometers in thickness. Obviously, variations in the position of the pigments will result in incorrect colors being displayed at a given pixel. Accordingly, exquisite voltage control is required for such a system. More details of this system are available in the following U.S. Patents, all of which are incorporated by reference in their entireties: U.S. Pat. Nos. 9,361,836, 9,921,451, 10,276,109, 10,353,266, 10,467,984, 10,593,272, and 10,657,869.

Unsurprisingly, having more colors available for displaying an image results in better-looking images, especially when the subject is a human or a landscape. Additionally, it has been found that images with the same pixel resolution, but smaller color sets tend to looking "grainy" because of the notable color differences between adjacent pixels that vary by only one shade. See also FIG. 7. Having more color depth comes with a price, however. Achieving hundreds of distinct color states with an ACeP-like system requires longer waveforms (voltage impulse sequences) so that all of the color particles are arranged in the correct order and with the correct spacing vis-à-vis the white pigment and the top light-transmissive electrode (viewing surface). [A distinct color state has a set of coordinates in the CIELAB color space (i.e., L*, a, b values) different from another distinct color (see also FIG. 9).] Furthermore, switching between images with a large number of available colors requires large data files and a processor capable of quickly identifying and sending the needed waveforms. For example, for a direct transition between a first image with 64 available colors to a second image with 64 available colors, there needs to be 64*64=4096 stored waveforms and a processor with the capacity to identify and send out the appropriate waveform in about 10 ms. Processors with this speed are available, however, they are typically associated with high-end graphics, artificial intelligence, and cryptocurrency mining. They are also fairly expensive compared to mobile electronics processors. Accordingly, in an eReader/tablet using color electrophoretic media, it is more common to drive from a first image, through a neutral state, and then to the second image. The neutral state represents a known initial state and thus reduces the problem to selecting from the neutral state to each of the 64 available states. Unfortunately, using a neutral transition state lengthens the switching time between states and can also cause unpleasant swings in color as the device "resets" the position of all of the particles in the electrophoretic medium.

The invention described below seeks to reduce the length of time required to switch between image states while using standard processors and controllers for electrophoretic displays, such as available from Ultrachip, Rockchip, and MTK, The invention relates to color electrophoretic displays, especially, but not exclusively, to electrophoretic displays capable of rendering more than two colors using a single layer of electrophoretic material comprising a plurality of colored particles, for example white, cyan, yellow, and magenta particles. In some instances, two of the particles will be positively-charged, and one (or two) of the particles will be negatively-charged. In some instances, one of the particles will be positively-charged, and three particles will be negatively-charged. In some instances, one of the particles will be negatively-charged, and three particles will be positively-charged. The particles may additionally be different in the type of charge species on the particle surface and/or the type of polymer(s) functionalized on the surface. The particles may comprise organic or inorganic pigments or dyes.

The term gray state is used herein in its conventional meaning in the imaging art to refer to a state intermediate two extreme optical states of a pixel and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display and should be understood as normally including extreme optical states which are not strictly black and white, for example the aforementioned white and dark blue states.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term impulse, when used to refer to driving an electrophoretic display, is used herein to refer to the integral of the applied voltage with respect to time during the period in which the display is driven.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Particle-based electrophoretic displays have been the subject of intense research and development for a number of years. In such displays, a plurality of charged particles (sometimes referred to as pigment particles) move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., Electrical toner movement for electronic paper-like display, IDW Japan, 2001, Paper HCS1-1, and Yamaguchi, Y., et al., Toner display using insulative particles charged triboelectrically, IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;

5

(h) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/0071465; 2016/0078820; 2016/0093253; 2016/0140910; and 2016/0180777 (these patents and applications may hereinafter be referred to as the MEDEOD (MEthods for Driving Electro-optic Displays) applications);

(i) Applications of displays; see for example U.S. Pat. Nos. 7,312,784 and 8,009,348; and (j) Non-electrophoretic displays, as described in U.S. Pat. No. 6,241,921; and U.S. Patent Applications Publication Nos. 2015/0277160; and U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

As indicated above most simple prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically, the two colors are black and white. If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

U.S. Pat. Nos. 8,576,476 and 8,797,634 describe multi-color electrophoretic displays having a single back plane comprising independently addressable pixel electrodes and a common, light-transmissive front electrode. Between the back plane and the front electrode is disposed a plurality of electrophoretic layers. Displays described in these applications are capable of rendering any of the primary colors (red, green, blue, cyan, magenta, yellow, white and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (for example, caused by light scattering or unwanted absorption) may affect the appearance of images formed in underlying electrophoretic layers.

Attempts have been made to provide full-color electrophoretic displays using a single electrophoretic layer. For example, U.S. Pat. No. 8,917,439 describes a color display comprising an electrophoretic fluid that comprises one or two types of pigment particles dispersed in a clear and colorless or colored solvent, the electrophoretic fluid being disposed between a common electrode and a plurality of pixel or driving electrodes. The driving electrodes are arranged to expose a background layer. U.S. Pat. No. 9,116,412 describes a method for driving a display cell filled with an electrophoretic fluid comprising two types of charged particles carrying opposite charge polarities and of two contrast colors. The two types of pigment particles are dispersed in a colored solvent or in a solvent with non-charged or slightly charged colored particles dispersed therein. The method comprises driving the display cell to display the color of the solvent or the color of the non-charged or slightly charged colored particles by applying a driving voltage that is about 1 to about 20% of the full driving voltage. U.S. Pat. Nos. 8,717,664 and 8,964,282 describe an electrophoretic fluid, and a method for driving an electrophoretic display. The fluid comprises first, second and third type of pigment particles, all of which are dispersed in a solvent or solvent mixture. The first and second types of pigment particles carry opposite charge polarities, and the third type of pigment particles has a charge level being less than about 50% of the charge level of the first or second type. The three types of pigment particles have different levels of threshold voltage, or different levels of mobility, or both.

Electrophoretic displays capable of rendering any color at any pixel location have been described in U.S. Pat. Nos. 10,475,399 and 10,678,111. In the '399 patent, a display is described in which a white (light-scattering) pigment moves in a first direction when addressed with a low applied voltage and in the opposite direction when addressed with a higher voltage. In the '111 patent, a full-color electrophoretic display is described in which there are four pigments: white, cyan, magenta and yellow, in which two of the pigments are positively-charged and two negatively charged. U.S. Patent Publication 2022/0082896 describes a full-color electrophoretic display in which there are four pigments: white, cyan, magenta and yellow, in which the three colored pigments are positively-charged and white pigment negatively charged. Embodiments of the present invention of this type are referred to as CMYW embodiments.

In addition, there are multi-particle display designs in which the color pigments scatter light (i.e., reflective color particles). U.S. Pat. No. 10,339,876 describes a display of this type having black, white and red particles capable of rendering three states. Similar display designs including four pigments can render four different colors, see, e.g. U.S. Pat. No. 9,922,603, or, by using a semi-transparent colored particle, such displays can render six colors, see, e.g., U.S. Pat. No. 11,640,803. Many of the multi-particle display designs using light-scattering particles incorporate lengthy and "flashy" updates, which some viewers find unappealing. The solutions described below can be used to decrease the "flashiness" of the updates in such displays, and in some cases decrease the time for an update.

SUMMARY

Disclosed herein are improved methods of driving full color electro-optic media between a first optical state and a second optical state, wherein the electro-optic medium is disposed between first and second electrodes and the electro-optic medium changes optical state in response to a voltage sequence applied between the first and second electrodes, wherein the electro-optic medium is capable of producing at least 64 distinct optical states. The method includes mapping the first optical state to a reduced color state, wherein the first optical state comprises one of the at least 64 distinct optical states and the reduced color state is one of no more than 16 distinct colors, identifying a voltage sequence that will cause the electro-optic medium to transition from the reduced color state mapped from the first optical state to the second optical state, wherein the second optical state comprises one of the at least 64 distinct optical states, and providing the voltage sequence between the first and second electrodes. In some embodiments, the electro-optic medium is capable of producing 128 distinct optical states. In some embodiments, the reduced color state is one of eight distinct colors. In some embodiments, the eight distinct colors are red, green, blue, cyan, yellow, magenta, white, and black. In some embodiments, mapping comprises matching the first optical state and the reduced color state on a look-up-table. In some embodiments, the providing step is done by a controller. In some embodiments, the electro-optic medium is an electrophoretic medium. In some embodiments, the electrophoretic medium includes a reflective white particle and at least one subtractive color particle or a reflective white particle and at least one reflective color particle. In some embodiments, the electrophoretic medium includes a fourth type of electrophoretic particle. In some embodiments, two of the types of particles are negatively charged and two of the types of particles are positively charged, or wherein one of the types of particles is negatively charged and three of the types of particles are positively charged, or wherein three of the types of particles are negatively charged and one of the types of particles is positively charged. In some embodiments, the electrophoretic medium is encapsulated in microcapsules or microcells. In some embodiments, the first electrode is a light-transmissive electrode and the second electrode is a pixel electrode of an active matrix of pixel electrodes. In some embodiments, the voltage sequence is DC balanced.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 5 illustrates the preferred position of each of the four sets of particles to produce eight standard colors in a white-cyan-magenta-yellow (WCMY) four-particle electrophoretic display, wherein the white particles are reflective and the cyan, magenta, and yellow particles are absorptive.

DETAILED DESCRIPTION

Figure 1A:
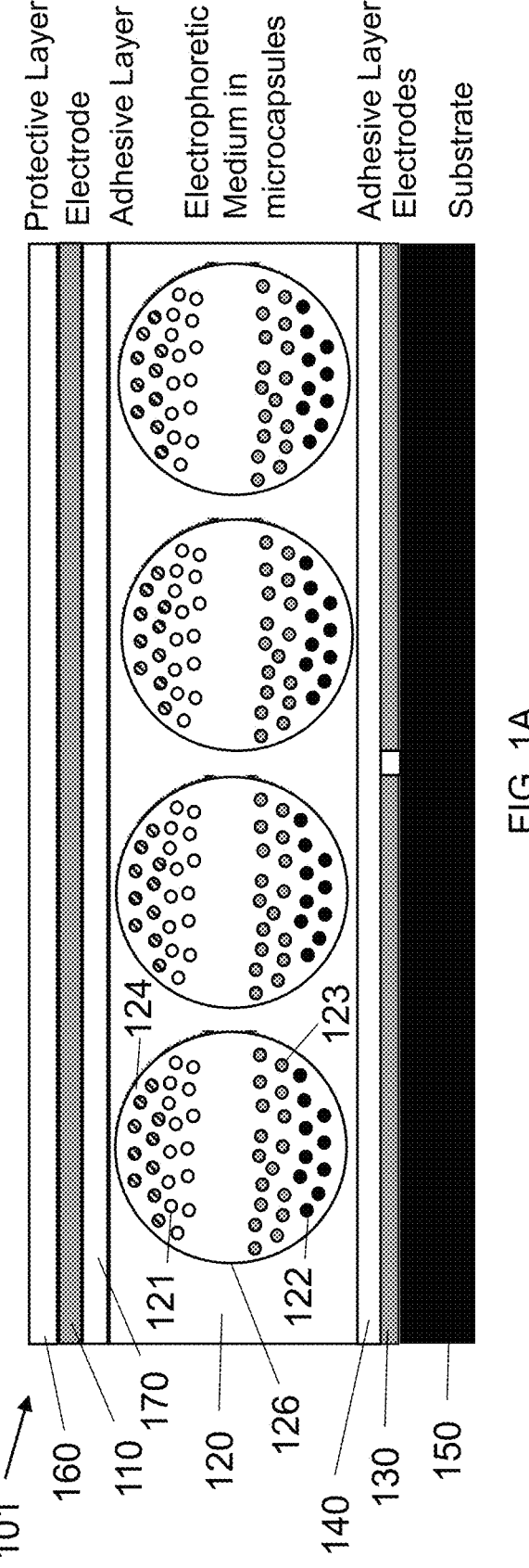
FIG. 1A is a representative cross-section of a four-particle electrophoretic display wherein the electrophoretic medium is encapsulated in capsules. The construction of FIG. 1A can be used for multi-particle electrophoretic media with both reflective and subtractive pigment particles.

The invention includes color electro-optic displays, such as electrophoretic displays with multi-particle electrophoretic media, and improved methods for driving color electro-optic media. When driving between a first image having a high color depth (i.e., greater than 64 distinct colors) and a second image having a high color depth, the data processing load can be reduced by mapping the set of colors in the first image to a reduced color set. In a preferred embodiment, the electro-optic medium is an electrophoretic medium that includes a white particle and cyan, yellow, and magenta subtractive primary-colored particles. Images with high color depth look less grainy and are more appealing to consumers. Because the electrophoretic medium is somewhat forgiving, providing a reduced instruction set, i.e., waveforms for driving from 8 color states to 128 color states, is sufficient for image changes with high color depth (i.e., 128 colors). Accordingly, the size of the look up table for a given set of operating conditions is reduced (i.e., 1024 entries per LUT vs. 16,384 entries per LUT) thereby reducing the storage needs and the processing time for providing the updates.

The methods of the invention are suitable to many different types of electro-optic displays, such as LCD, LED, OLED, rLCD, and EPD. However, the methods of the invention are particularly well-suited for use with electrophoretic displays including four (or more) particles as discussed in the Background. The electrophoretic fluid may be encapsulated in microcapsules or incorporated into microcell structures that are thereafter sealed with a polymeric layer. The microcapsule or microcell layers may be coated or laminated to a plastic substrate or film bearing a transparent coating of an electrically conductive material. Alternatively, the microcapsules may be coated onto a light transmissive substrate or other electrode material using spraying techniques. (See U.S. Pat. No. 9,835,925, incorporated by reference herein). The resulting assembly may be laminated to a backplane bearing pixel electrodes using an electrically conductive adhesive. The assembly may alternatively be attached to one or more segmented electrodes on a backplane, wherein the segmented electrodes are driven directly.

Electrophoretic media used herein include charged particles that vary in color, reflective or absorptive properties, charge density, and mobility in an electric field (measured as a zeta potential). A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes, photonic crystals, quantum dots, etc., may also be used in the electrophoretic media and displays of the present invention. For example, the electrophoretic medium might include a fluid, a plurality of first and a plurality of second particles dispersed in the fluid, the first and second particles bearing charges of opposite polarity, the first particle being a light-scattering particle and the second particle having one of the subtractive primary colors, and a plurality of third and a plurality of fourth particles dispersed in the fluid, the third and fourth particles bearing charges of opposite polarity, the third and fourth particles each having a subtractive primary color different from each other and from the second particles, wherein the electric field required to separate an aggregate formed by the third and the fourth particles is greater than that required to separate an aggregate formed from any other two types of particles.

The electrophoretic media of the present invention may contain any of the additives used in prior art electrophoretic media as described for example in the E Ink and MIT patents and applications mentioned above. Thus, for example, the electrophoretic medium of the present invention will typically comprise at least one charge control agent to control the charge on the various particles, and the fluid may have dissolved or dispersed therein a polymer having a number average molecular weight in excess of about 20,000 and being essentially non-absorbing on the particles to improves the bistability of the display, as described in the aforementioned U.S. Pat. No. 7,170,670.

In one embodiment, the present invention uses a light-scattering particle, typically white, and three substantially non-light-scattering particles. There is of course no such thing as a completely light-scattering particle or a completely non-light-scattering particle, and the minimum degree of light scattering of the light-scattering particle, and the maximum tolerable degree of light scattering tolerable in the substantially non-light-scattering particles, used in the electrophoretic of the present invention may vary somewhat depending upon factors such as the exact pigments used, their colors and the ability of the user or application to tolerate some deviation from ideal desired colors. The scattering and absorption characteristics of a pigment may be assessed by measurement of the diffuse reflectance of a sample of the pigment dispersed in an appropriate matrix or liquid against white and dark backgrounds. Results from such measurements can be interpreted according to a number of models that are well-known in the art, for example, the one-dimensional Kubelka-Munk treatment. In the present invention, it is preferred that the white pigment exhibit a diffuse reflectance at 550 nm, measured over a black background, of at least 5% when the pigment is approximately isotropically distributed at 15% by volume in a layer of thickness 1 μm comprising the pigment and a liquid of refractive index less than 1.55. The yellow, magenta and cyan pigments preferably exhibit diffuse reflectances at 650, 650 and 450 nm, respectively, measured over a black background, of less than 2.5% under the same conditions. (The wavelengths chosen above for measurement of the yellow, magenta and cyan pigments correspond to spectral regions of minimal absorption by these pigments.) Colored pigments meeting these criteria are hereinafter referred to as "non-scattering" or "substantially non-light-scattering". Specific examples of suitable particles are disclosed in U.S. Pat. No. 9,921,451, which is incorporated by reference herein.

Alternative particle sets may also be used, including four sets of reflective particles, or one absorptive particle with three or four sets of different reflective particles, i.e., such as described in U.S. Pat. Nos. 9,922,603 and 10,032,419, which are incorporated by reference herein. For example, white particles may be formed from an inorganic pigment, such as $TiO_2$, $ZrO_2$, ZnO, $Al_2O_3$, $Sb_2O_3$, $BaSO_4$, $PbSO_4$ or the like, while black particles may be formed from CI pigment black 26 or 28 or the like (e.g., manganese ferrite black spinel or copper chromite black spinel) or carbon black. The third/fourth/fifth type of particles may be of a color such as red, green, blue, magenta, cyan or yellow. The pigments for this type of particles may include, but are not limited to, CI pigment PR 254, PR122, PR149, PG36, PG58, PG7, PB28, PB15:3, PY138, PY150, PY155 or PY20. Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

Figure 1B:
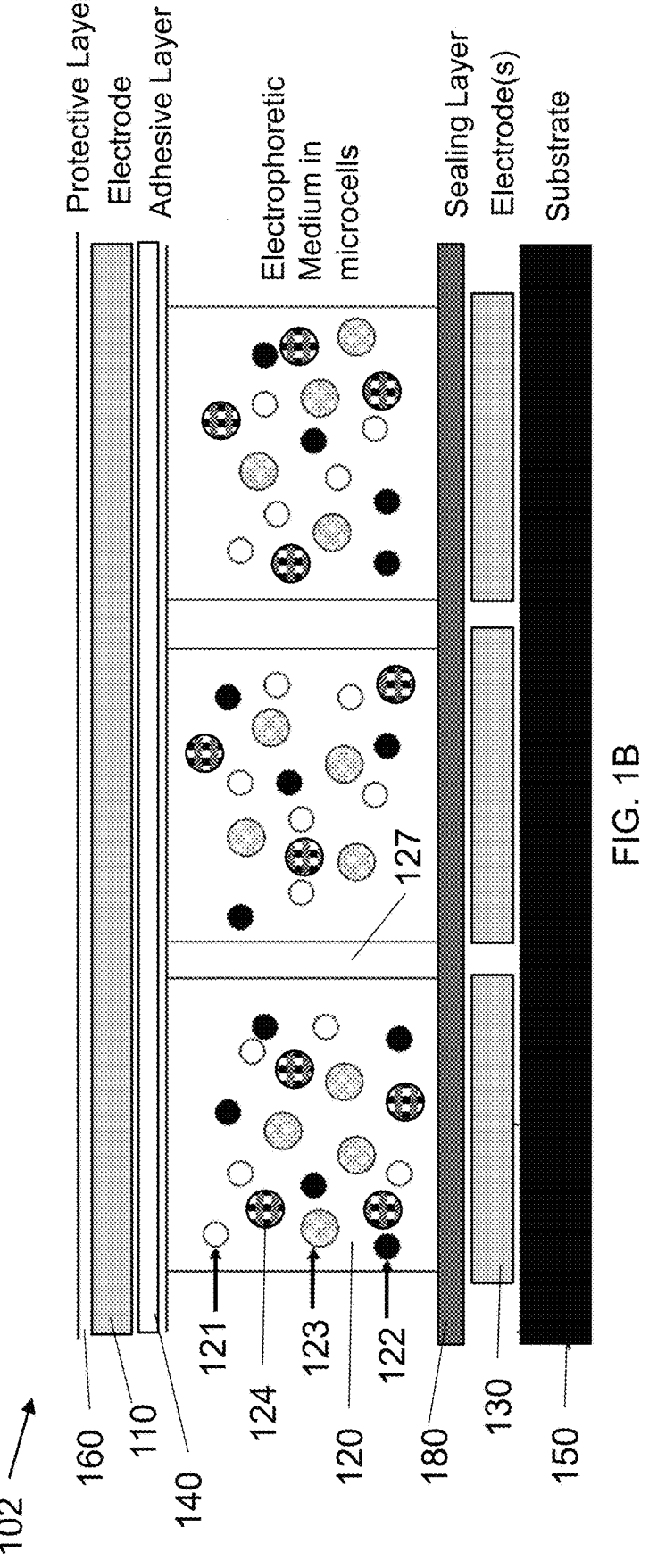
FIG. 1B is a representative cross-section of a four-particle electrophoretic display wherein the electrophoretic medium is encapsulated in microcells. The construction of FIG. 1B can be used for multi-particle electrophoretic media with both reflective and subtractive pigment particles.

As shown in FIG. 1A and FIG. 1B, an electrophoretic display (101, 102) typically includes a top transparent electrode 110, an electrophoretic medium 120, and a bottom electrode 130, which is often a pixel electrode of an active matrix of pixels controlled with thin film transistors (TFT). In the electrophoretic media 120 described herein, there are four different types of particles, 121, 122, 123, and 124, however more (or fewer) particle sets can be used with the methods and displays described herein. For example, the techniques of the invention could be used with a set of three types of particles, for example white, black, and red, wherein one of the three different types of particles has a charge magnitude lower than the other two types of particles. In some instances, two of the particles will be positively-charged, and one (or two) of the particles will be negatively-charged. In some instances, one of the particles will be positively-charged, and three particles will be negatively-charged. In some instances, one of the particles will be negatively-charged, and three particles will be positively-charged. The electrophoretic medium 120 is typically compartmentalized such by a microcapsule 126 or the walls of a microcell 127. An optional adhesive layer 140 can be disposed adjacent any of the layers, however, it is typically adjacent an electrode layer (110 or 130). There may be more than one adhesive layer 140 in a given electrophoretic display (105, 106), however only one layer is more common. The entire display stack is typically disposed on a substrate 150, which may be rigid or flexible. The display (101, 102) typically also includes a protective layer 160, which may simply protect the top electrode 110 from damage, or it may envelop the entire display (101, 102) to prevent ingress of water, etc. Electrophoretic displays (101, 102) may also include sealing layers 180 as needed. In some embodiments the adhesive layer 140 may include a primer component to improve adhesion to the electrode layer 110, or a separate primer layer (not shown in FIG. 1B) may be used. The structures of electrophoretic displays and the component parts, pigments, adhesives, electrode materials, etc., are described in many patents and patent applications published by E Ink Corporation, such as U.S. Pat. Nos. 6,922,276; 7,002,728; 7,072,095; 7,116,318; 7,715,088; and 7,839,564, all of which are incorporated by reference herein in their entireties.

In some embodiments, e.g., as shown in FIG. 1A, the electrophoretic display may include a light-transmissive electrode, an electrophoretic medium, and a plurality of rear pixel electrodes. To produce a high-resolution display, e.g., for displaying images, each pixel electrode 130 is individually-addressable without interference from adjacent pixels so that an image file is faithfully reproduced on the display. One way to achieve this objective is to provide an array of non-linear elements, such as transistors or diodes, with at least one non-linear element associated with each pixel, to produce an "active matrix" display. (See FIG. 2.) An addressing or pixel electrode 130, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor.

Conventionally, in high resolution arrays, the pixels are arranged in a two-dimensional array of rows and columns, such that any specific pixel is uniquely defined by the intersection of one specified row and one specified column. (See FIG. 3) The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are typically connected to a row driver (gate driver, gate controller), which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column electrodes are typically connected to column drivers (source driver, source controller), which place upon the various column electrodes voltages selected to drive the pixels in the selected row to their desired optical states. (The aforementioned voltages are with respect to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner. The time between successive updates of a particular row in the display is known as a "frame." Thus, a display that is updated at 60 Hz has frames that are 16 msec in length. A variety of frame times can be used with electrophoretic displays, such as an 8 msec frame, a 12 msec frame, a 5 msec frame, etc. In some instances, the frame is greater than 1 msec and less than 30 msec.

It should be noted that the magnitude of the voltage that can be provided in such row-column driving can be limited by the materials from which the non-linear element, e.g., thin film transistor, is fabricated. In many embodiments the semiconductor material is silicon, especially amorphous silicon, which is able to control driving voltages on the order of ±15 V. In other embodiments, the semi-conductor of the thin-film-transistor may be a metal oxide, such indium gallium zinc oxide (IGZO), which allows for a wider range of driving voltages, e.g., up to ±30 V e.g., as described in U.S. Patent Publication No. US 2022/0084473. This design feature is particularly pertinent when driving waveforms to sort the pigments of a multi-particle system. In such systems, it is beneficial to provide at least five voltage levels (high positive, low positive, zero, low negative, high negative), and with higher total voltages, it is easier to separate the particles. For greater details, see U.S. Patent Publication 2021-0132459.

Figure 2:
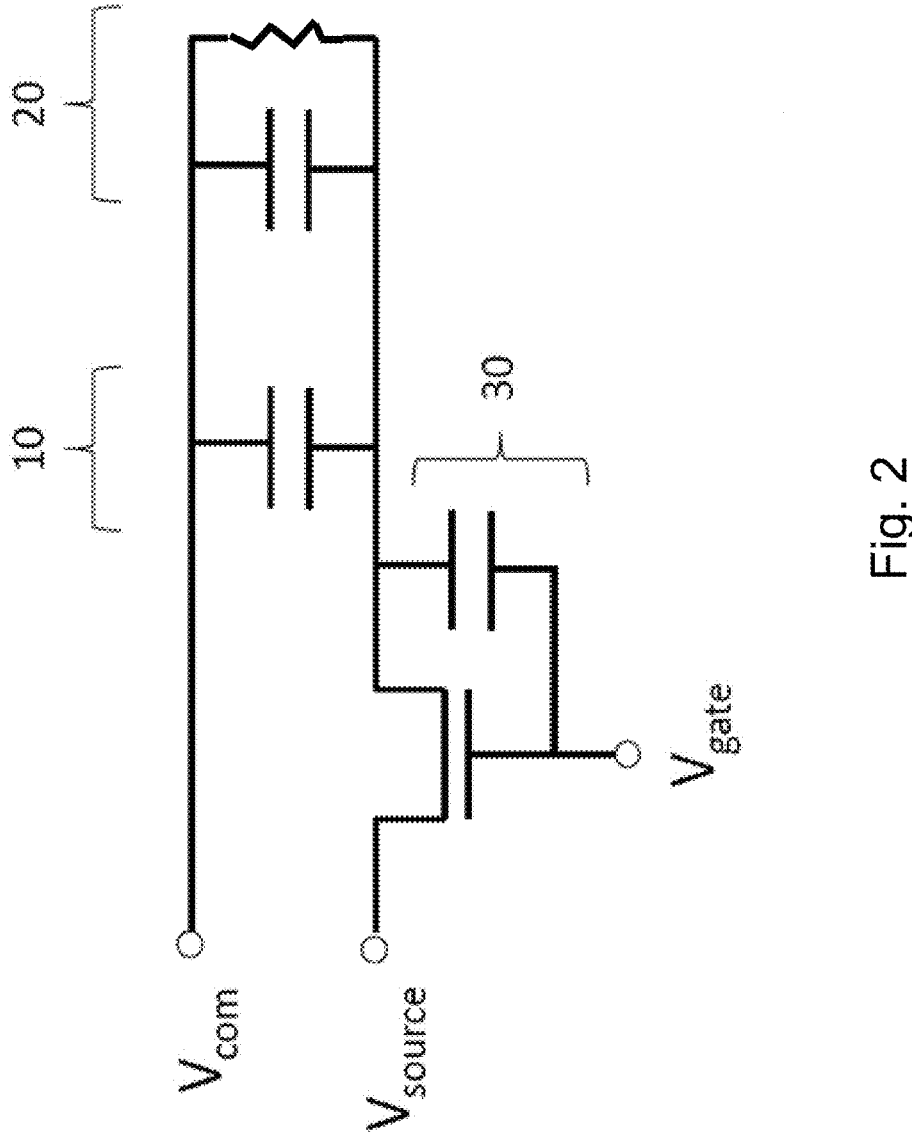
FIG. 2 illustrates an exemplary equivalent circuit of a single pixel of an electrophoretic display that uses an active-matrix backplane of pixel electrodes coupled to a storage capacitor.

FIG. 2 of the accompanying drawings depicts an exemplary equivalent circuit of a single pixel of an electrophoretic display. As illustrated, the circuit includes a storage capacitor 10 formed between a pixel electrode (element 130 of FIGS. 1A and 1B) and a capacitor electrode. The electrophoretic medium 20 is represented as a capacitor and a resistor in parallel. In some instances, direct or indirect coupling capacitance 30 between the gate electrode of the transistor associated with the pixel and the pixel electrode (usually referred to a as a "parasitic capacitance") may create unwanted noise to the display. Usually, the parasitic capacitance 30 is much smaller than that of the storage capacitor 10, and when the pixel rows of a display is being selected or deselected, the parasitic capacitance 30 may result in a small negative offset voltage to the pixel electrode, also known as a "kickback voltage", which is usually less than 2 volts. [In some embodiments, to compensate for the unwanted "kickback voltage", a common potential $V_{com}$, may be supplied to the top plane electrode and the capacitor electrode associated with each pixel, such that, when $V_{com}$ is set to a value equal to the kickback voltage ($V_{KB}$), every voltage supplied to the display may be offset by the same amount, and no net DC-imbalance experienced.]

In a conventional electrophoretic display using an active-matrix backplane, each pixel electrode has associated therewith a capacitor electrode (storage capacitor) such that the pixel electrode and the capacitor electrode form a capacitor; see, for example, International Patent Application WO 01/07961. In some embodiments, N-type semiconductor (e.g., amorphous silicon) may be used to from the transistors and the "select" and "non-select" voltages applied to the gate electrodes can be positive and negative, respectively.

Figure 3:
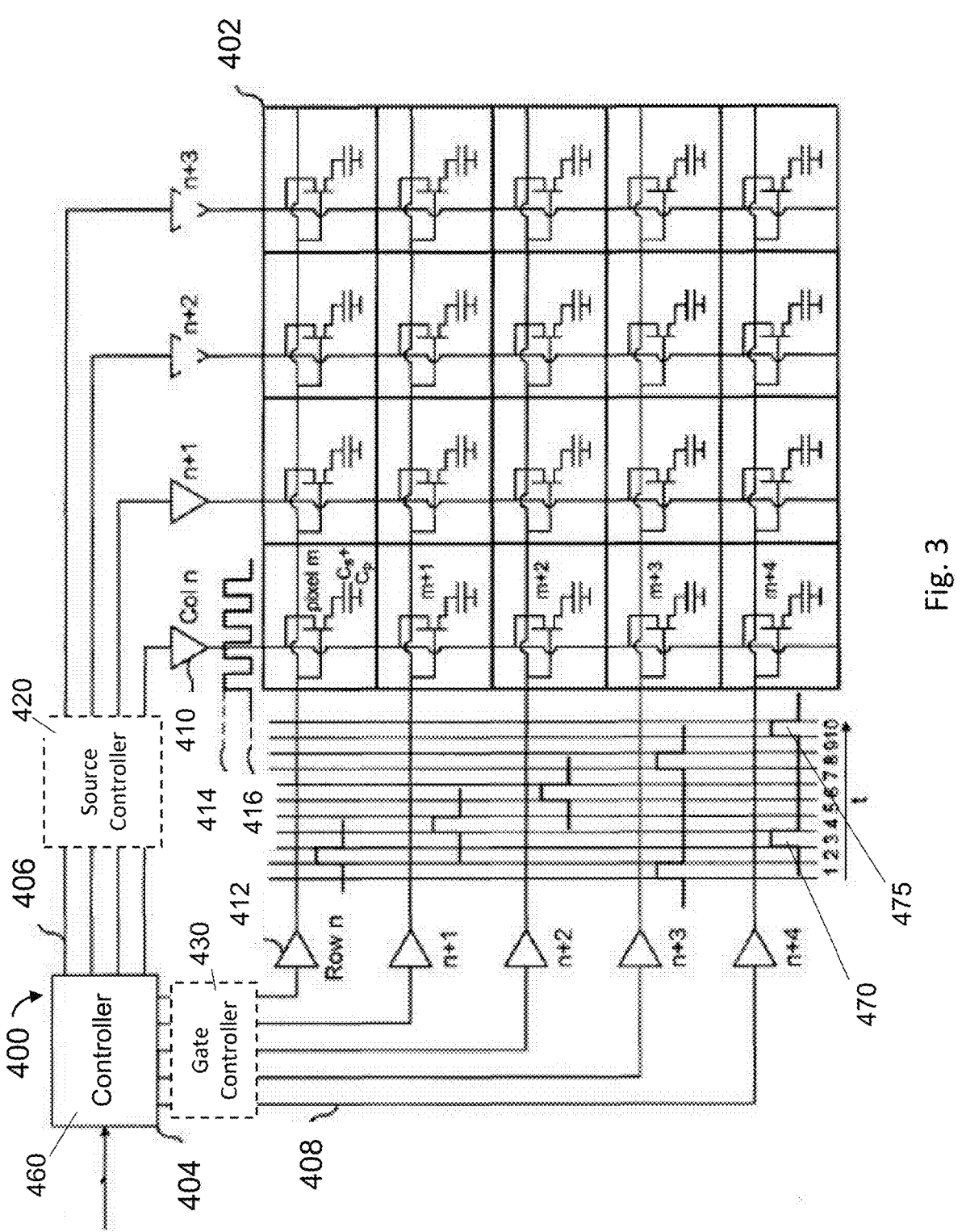
FIG. 3 is a diagrammatic view of an exemplary driving system for controlling voltages provided to pixel electrodes in an active-matrix device. The resulting driving voltages can be used to set an optical state of a multi-particle electrophoretic medium.

Additional details of the row-column addressing used in an "active matrix" display are shown in FIG. 3. An addressing or pixel electrode, which addresses one pixel, is fabricated on a substrate 402 and connected to the appropriate voltage sources 404 and 406 through the associated non-linear element. It is understood that the voltage sources 404 and 406 may originate from separate circuit elements or the voltages can be delivered with the assistance of a single power supply and a power management integrated circuit (PMIC). In some instances, an intervening source controller 420 is used to control the supplied voltage, however in other embodiments the controller 460 is configured to control the entire addressing process, including coordinating the gate and source lines. It is also to be understood that FIG. 3 is an illustration of the layout of an active-matrix backplane 400 but that, in reality, the active matrix has depth and some elements, e.g., the TFT, may actually be underneath the pixel electrode, with a via providing an electrical connection from the drain to the pixel electrode above.

Conventionally, in high resolution arrays, the pixels are arranged in a two-dimensional array of rows and columns, such that any specific pixel is uniquely defined by the intersection of one specified row and one specified column. The sources of all the transistors in each column are connected to a single column (scan) line 406, while the gates of all the transistors in each row are connected to a single row (gate) line 408; again, the assignment of sources to rows and gates to columns is conventional but essentially arbitrary, and could be reversed if desired. The gate lines 408 are optionally connected to a gate controller 430, which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column scan lines 406 are optionally connected to a source controller 420, which place upon the various scan lines 406 voltages selected to drive the pixels in the selected row to their desired optical states. (The aforementioned voltages are relative to a common top electrode, and is not shown in FIG. 3.) With conventional driving, after a pre-selected interval known as the "line address time" the selected row is deselected, the next row is selected, and the voltages on the column drivers are changed so that the next line of the display is written. In "typical" backplane driving, this process is repeated in a linear fashion so that the entire display is written in a row-by-row manner. As shown in FIG. 3, the temporal spacing between gate voltage pulses of respective frames is typically constant and represent the rhythm of line by line addressing. Notably, the invention does not implement an even spacing between respective gate voltage pulses for a given address row of pixel electrodes.

Figure 4:
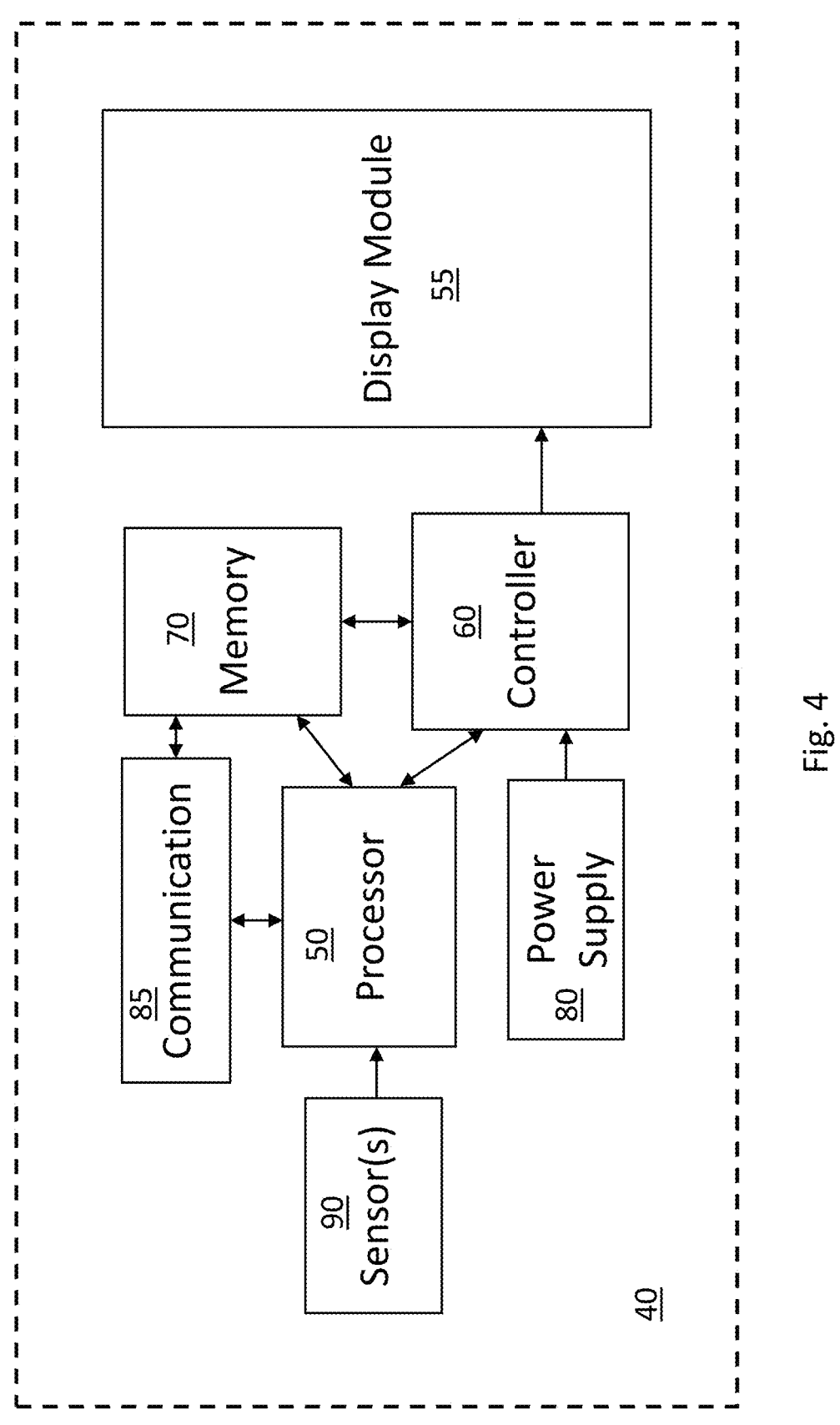
FIG. 4 illustrates an exemplary electrophoretic display that includes a display module. The electrophoretic display also includes a processor, memory, one or more power supplies, and a controller. The electrophoretic display may also include sensors to allow the electrophoretic display to adjust operational parameters based upon the ambient environment, e.g., temperature and illumination.

The active-matrix backplane described with respect to FIG. 3 is coupled to an electro-optic medium, e.g., as illustrated in FIGS. 1A and 1B, and typically sealed to create a display module 55, as shown in FIG. 4. Such a display module 55 becomes the focus of an electrophoretic display 40. The electrophoretic display 40 will typically include a processor 50, which is configured to coordinate the many functions relating to displaying content on the display module 55, and to transform "standard" images, such as sRGB images to a color regime that best duplicates the image on the display module 55. Of course, if the electrophoretic display is being used as a sensor or counter, the content may relate to other inputs. The processor is typically a mobile processor chip, such as made by Freescale or Qualcomm, although other manufacturers are known. The processor is in frequent communication with the non-transitory memory 70, from which it pulls image files and/or look up tables to perform the color image transformations described below. The non-transitory memory 70 may also include gate driving instructions to the extent that a particular color transition may require a different gate driving pattern. The electrophoretic display 40 may have more than one non-transitory memory chip. The non-transitory memory 70 may be flash memory. Once the desired image has been converted for display on the display module 55, the specific image instructions are sent to a controller 60, which facilitates voltage sequences being sent to the respective thin film transistors (described above). Such voltages typically originate from one or more power supplies 80, which may include, e.g., a power management integrated chip (PMIC). The electrophoretic display 40 may additionally include communication 85, which may be, for example, WIFI protocols or BLUETOOTH, and allows the electrophoretic display 40 to receive images and instructions, which also may be stored in memory 70. The electrophoretic display 40 may additionally include one or more sensors 90, which may include a temperature sensor and/or a photo sensor, and such information can be fed to the processor 50 to allow the processor to select an optimum look-up-table when such look-up-tables are indexed for ambient temperature or incident illumination intensity or spectrum. In some instances, multiple components of the electrophoretic display 40 can be embedded in a singular integrated circuit. For example, a specialized integrated circuit may fulfill the functions of processor 50 and controller 60.

As shown in FIG. 5, the Advanced Color E-Paper electrophoretic composition ACEP (e.g., comprising a WCMY particle system) in principle works similarly to printing on bright white paper in that the viewer only sees those colored pigments that are on the viewing side of the white pigment (i.e., the only pigment that scatters light). In FIG. 5, it is assumed that the viewing surface of the display is at the top (as illustrated), i.e., a user views the display from this direction, and the illumination light is also incident from this direction. In FIG. 5 the light scattering particle is assumed to be the white pigment. This light-scattering white particle forms a white reflector against which any particles above the white particles (as illustrated in FIG. 5) are viewed. A portion of the incident light passes through the subtractive particles, is reflected from the white particles below the subtractive particles, passes back through these particles and emerges from the display. A different portion of the incident light is absorbed by the subtractive particles. Thus, the particles above the white particles may absorb various colors and the color appearing to the user is that resulting from the combination of particles above the white particles. Any particles disposed below the white particles (behind from the user's point of view) are masked by the white particles and do not affect the color displayed. Because the second, third and fourth particles are substantially non-light-scattering, their order or arrangement relative to each other is unimportant, but for reasons already stated, their order or arrangement with respect to the white (light-scattering) particles is critical.

More specifically, when the cyan, magenta and yellow particles lie below the white particles (Situation [A] in FIG. 5), there are no particles above the white particles and the pixel simply displays a white color. When a single particle is above the white particles, the color of that single particle is displayed, yellow, magenta and cyan in Situations [B], [D] and [F] respectively in FIG. 5. When two particles lie above the white particles, the color displayed is a combination of those of these two particles; in FIG. 5, in Situation [C], magenta and yellow particles display a red color, in Situation [E], cyan and magenta particles display a blue color, and in Situation [G], yellow and cyan particles display a green color. Finally, when all three colored particles lie above the white particles (Situation [H] in FIG. 5), all the incoming light is absorbed by the three subtractive primary-colored particles and the pixel displays a black color.

It is possible that one subtractive primary color could be rendered by a particle that scatters light, so that the display would comprise two types of light-scattering particle, one of which would be white and another colored. In this case, however, the position of the light-scattering colored particle with respect to the other colored particles overlying the white particle would be important. For example, in rendering the color black (when all three colored particles lie over the white particles) the scattering, colored particle cannot lie over the non-scattering colored particles (otherwise they will be partially or completely hidden behind the scattering particle and the color rendered will be that of the scattering colored particle, not black).

FIG. 5 shows an idealized situation in which the colors are uncontaminated (i.e., the light-scattering white particles completely mask any particles lying behind the white particles). In practice, the masking by the white particles may be imperfect so that there may be some small absorption of light by a particle that ideally would be completely masked. Such contamination typically reduces both the lightness and the chroma of the color being rendered. In the electrophoretic medium of the present invention, such color contamination should be minimized to the point that the colors formed are commensurate with an industry standard for color rendition. A particularly favored standard is SNAP (the standard for newspaper advertising production), which specifies L*, a* and b* values for each of the eight primary colors referred to above. (Hereinafter, "primary colors" will be used to refer to the eight colors, black, white, the three subtractive primaries and the three additive primaries as shown in FIG. 5.)

Figure 6:
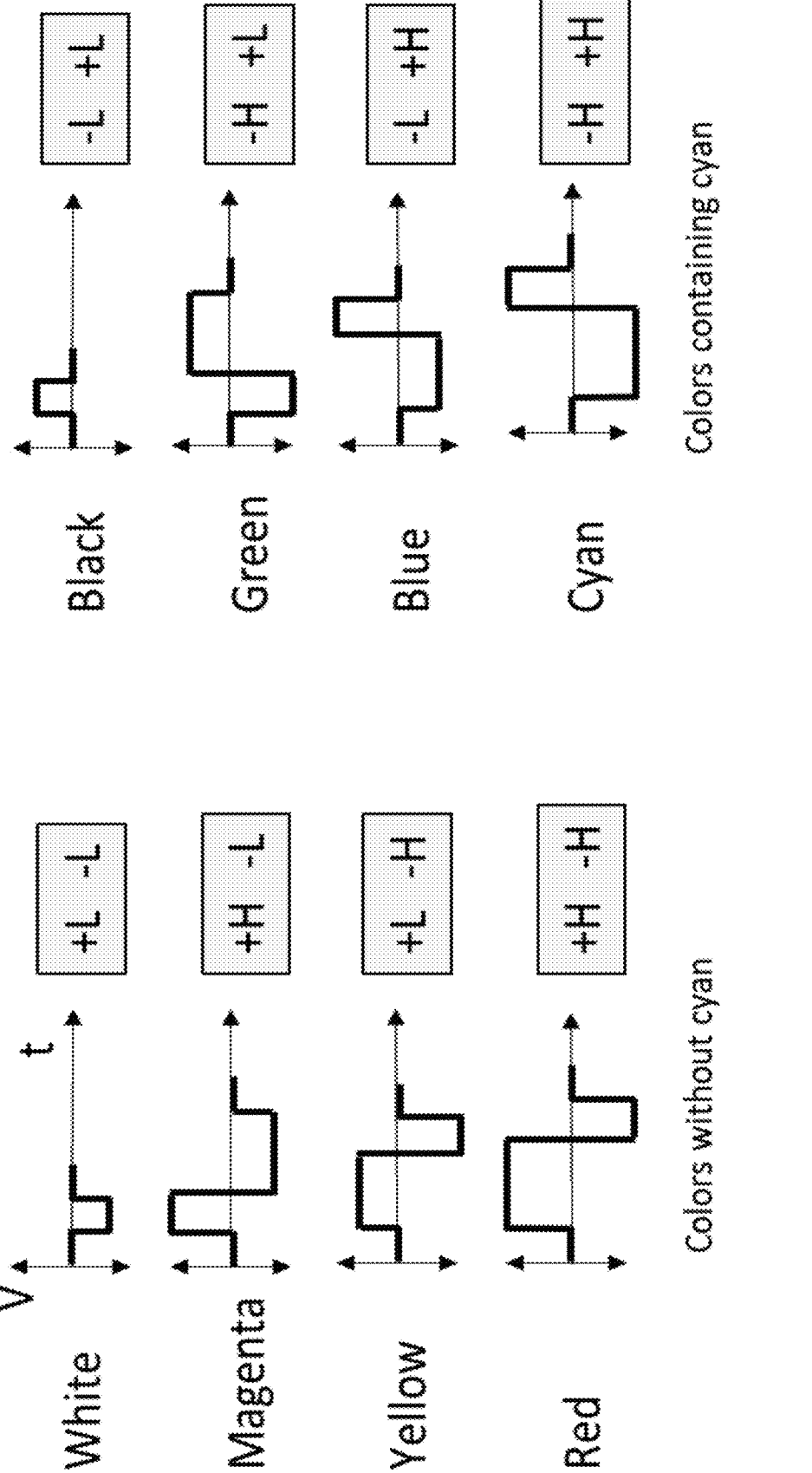
FIG. 6 shows exemplary push-pull drive schemes for addressing an electrophoretic medium including three subtractive (cyan, yellow, magenta) particles and a scattering (white) particle.

FIG. 6 shows typical waveforms (in simplified form) used to drive a four-particle WCMY electrophoretic display system described above. The waveforms of FIG. 6 only produce 8 distinct colors, i.e., a low color depth. Such waveforms have a "push-pull" structure: i.e., they consist of a dipole comprising two pulses of opposite polarity. Typically, each dipole has a pulse of voltage $V_1$ applied for a time $t_1$ followed by a voltage $V_2$ applied for time $t_2$. The dipole is impulse balanced when $V_1t_1+V_2t_2=0$. The magnitudes and lengths of these pulses determine the color obtained. At a minimum, there should be five such voltage levels. FIG. 6 shows high and low positive and negative voltages, as well as zero volts. Typically, "low" (L) refers to a range of about 5-15V, while "high" (H) refers to a range of about 15-30V. In general, the higher the magnitude of the "high" voltages, the better the color gamut achieved by the display. In some instances, especially where more colors are required, medium voltages are also included. The "medium" (M) level is typically around 15V; however, the value for M will depend somewhat on the composition of the particles, as well as the environment of the electrophoretic medium. Transitions to achieve a greater number of total colors will typically involve longer waveforms because of a need to have more control over the position of the respective particles.

Notably with the dipole waveforms of FIG. 6, the dipoles used to provide magenta, yellow, green and blue colors are at least approximately impulse balanced. On the other hand, it is not necessary to use dipole addressing to produce black and white. Simple monopole pulses in either direction will move the oppositely-charged colored and white pigments towards and away from the viewing surface, and thus the display behaves under these circumstances like a conventional display containing black and white pigments. Additionally, because these monopole pulses are not DC balanced, additional charge clearing pulses must be incorporated into the device drive protocol, either at the beginning or end of an image update, or at the end of an extended unbalanced drive sequence, such as may happen when scrolling text. Dipole addressing can break the symmetry even when the waveform is impulse balanced overall, however. For example, one can have $\int Vdt=0$, and $\int V^3dt\neq0$. See, e.g., Dukhin A S, Dukhin S S, "Aperiodic capillary electrophoresis method using an alternating current electric field for separation of macromolecules." *Electrophoresis,* 2005 June; 26 (11): 2149-53. Then, as long as pigment mobility depends on applied electric field, this kind of waveform can result in overall pigment drift.

Figure 7:
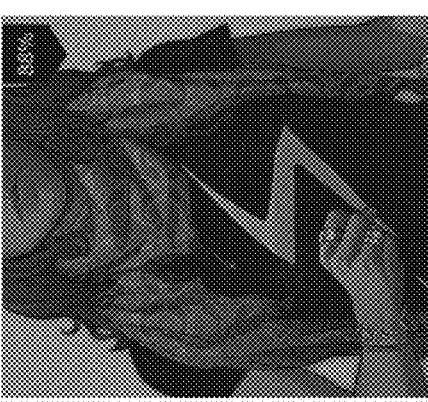
FIG. 7 illustrates the difference in graininess for the same image with the same pixel resolution but different color "depths", i.e., the number of distinct colors available at each pixel.
Figure 7:
Figure 7:
Figure 7:
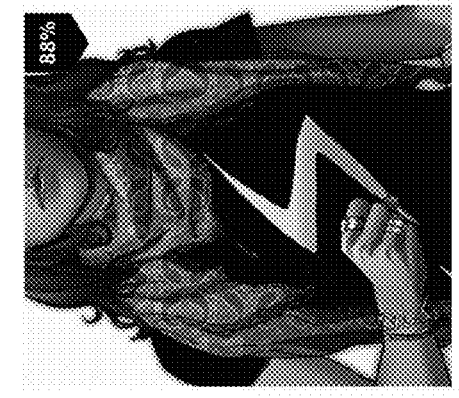

Having more than 8 distinct colors available for image processing, i.e., 16 distinct colors, i.e., 32 distinct colors, i.e., 64 distinct colors, i.e., 128 distinct colors, i.e., 256 distinct colors, or more, allows an electro-optic display to produce images that are less grainy as shown in FIG. 7. In FIG. 7, an original sRGB image, with 256 levels for each of R, G, and B is shown on the far left. Rendering the image with an ACeP-type electrophoretic display using 8 distinct colors results in the image on the middle left, using 16 distinct colors the middle right, and 64 colors the far right. With the addition of more colors, the ACeP-type rendered images are improved. There is less grain in areas of high contrast, such as the lightning bolt, and there is improved clarity and vibrancy, such as in the scarf. However, as discussed previously, there are drawbacks in terms of update time and processor/memory requirements to achieve this higher color density.

Figure 8:
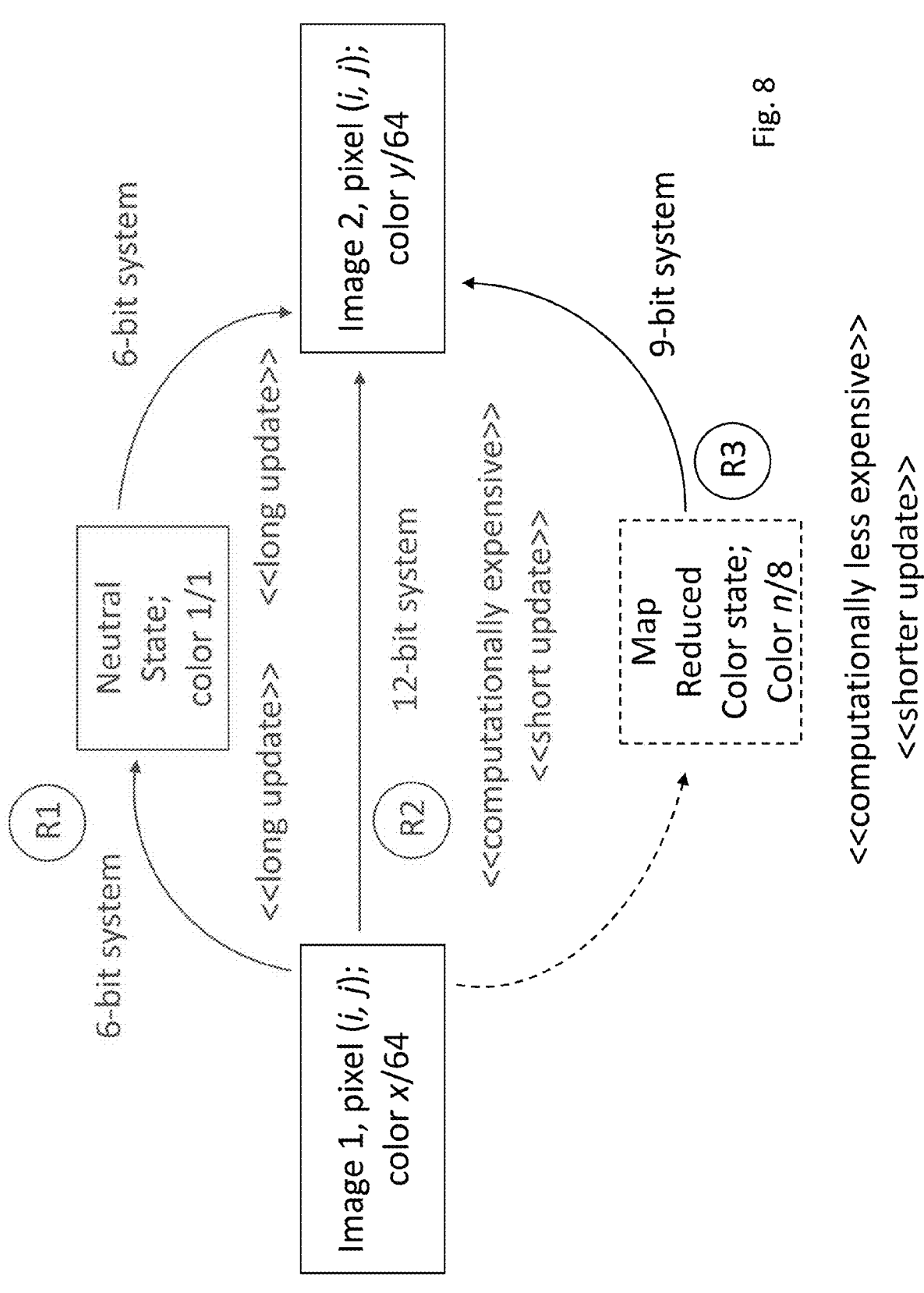
FIG. 8 shows a comparison between R1 driving, using a neutral state, R2 driving, wherein a waveform is created/stored for each possible transition between a first color state and a second color state, and R3, which is the method of the invention and involves mapping the prior image color state to a reduced color state, thereby greatly reducing the number of waveforms that have to be created/stored.

There are at least three ways to transition an electro-optic display between a first image, wherein pixel (i, j), having a first color of a large set, e.g., x of 64 colors, transitions to a second color of a large set, e.g., y of 64 colors, as shown in FIG. 8. R1 illustrate a more typical drive scheme using commercially-available electrophoretic controller chips and processors. In R1, the transition takes place via a neutral state, that is the first color state is driven to a known configuration (e.g., completely mixed colors, e.g., black, e.g., white), and then the pixel transitions from the neutral state to the second color state. As a result, less computational power is needed to select and provide the waveforms (i.e., only 64 waveforms need to be stored for the transition from the first state to the neutral state and back). However, this update is longer and more "flashy" because all of the electrophoretic particles have to be completely rearranged for each update. R2 represents a more elegant solution, but one that is more computationally-expensive, therefore requiring more sophisticated (and expensive) controllers, processors, memory, etc. R2 simply employs a state-to-state waveform for each of the initial colors to each of the final colors. In the case of a 64 color system, this requires 4096 different waveforms. Compared to R1, the R2 transitions are faster and more pleasing to a user (provided that the necessary processing power is available).

Figure 9:
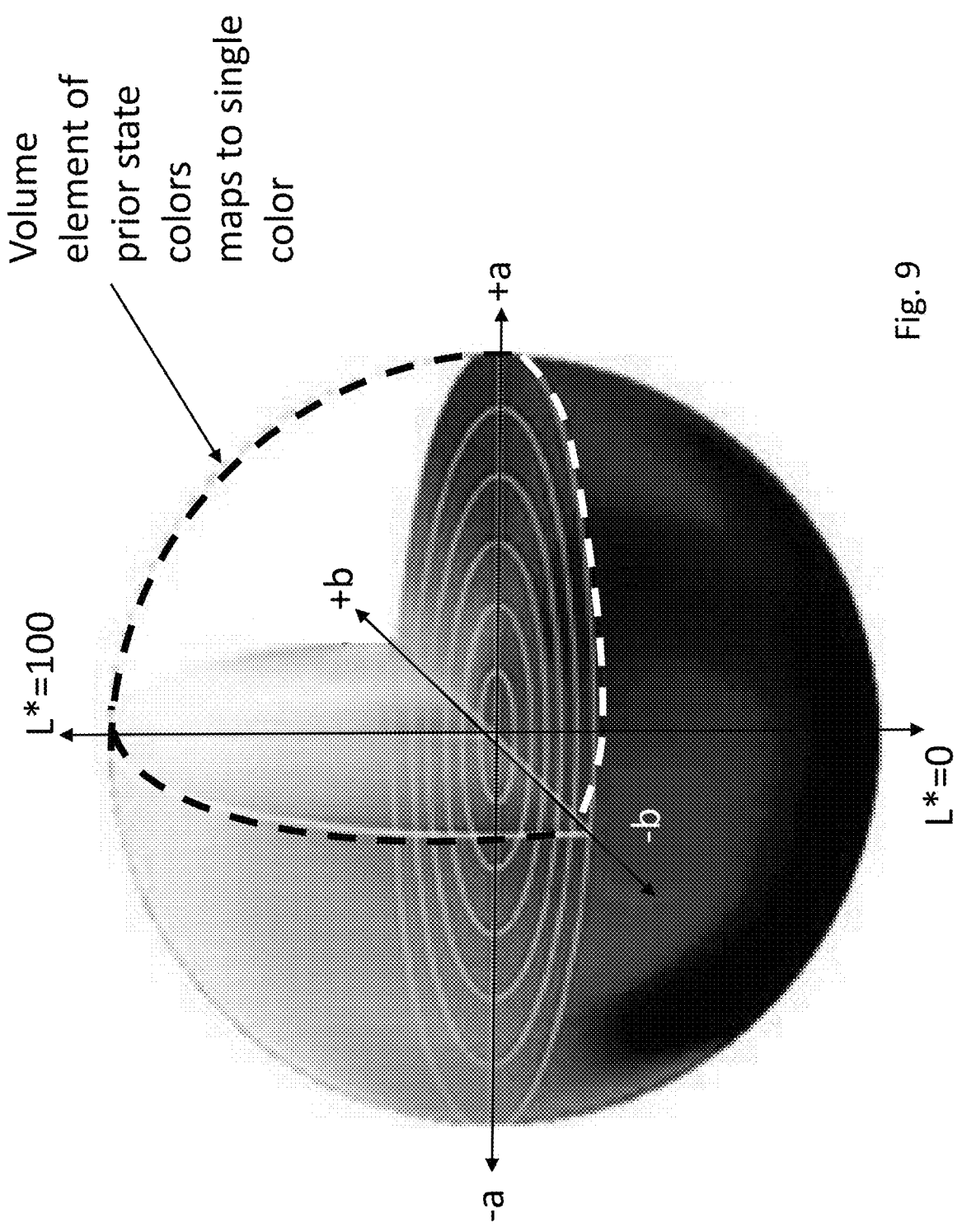
FIG. 9 illustrates one possible method for mapping a collection of available color states into a reduced color.

An embodiment of the invention is illustrated by R3, wherein a calculated transition from image 1 to image 2 makes use of a mapping of initial states into a set of reduced color states to allow for faster, more pleasing updates, but using fewer total waveforms as compared to R2. In R3, the processor or controller maps an initial state of 64 colors into a reduced set of 8 colors. This can be done in a number of ways. The process is illustrated in FIG. 9, where each portion of the color sphere (CIELAB space) is collapsed into a single representative color. Typically, the mapping is done with a look-up table in the memory files, but it can be done mathematically. It is also possible that the color sphere is not divided into equal volumes because for the image set there is less need to have a gradient of colors in one portion of the color sphere versus another. For example, a fall landscape may need more color density in red, yellow, magenta, and cyan, but less in green and blue. As a result of the mapping, there are 8×64=512 waveforms required to be processed and selected, however, 512 waveforms is an order of magnitude smaller than 4096. Because of the color mapping of the initial state, there may be some "slip" in the final color because the waveform used isn't as precise as if it had been selected from 4096 options. However, in practice, it is rare that the difference is noticeable. In some instances, it may be appropriate to use a global reset to make sure that all of the pixels are actually in the correct color state, however such global resets can be done sparingly or only upon initiation by a user.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. A method for driving an electro-optic medium between a first optical state and a second optical state, wherein the electro-optic medium is disposed between first and second electrodes and the electro-optic medium changes optical states in response to voltage sequences applied between the first and second electrodes, wherein the electro-optic medium is capable of producing at least 64 distinct optical states, the method comprising:

mapping the first optical state to a reduced color state, wherein the first optical state comprises one of the at least 64 distinct optical states and the reduced color state is one of no more than 16 distinct colors;

identifying a voltage sequence that will cause the electro-optic medium to transition from the reduced color state mapped from the first optical state to the second optical state, wherein the second optical state comprises another one of the at least 64 distinct optical states; and providing the voltage sequence between the first and second electrodes.

2. The method of claim 1, wherein the electro-optic medium is capable of producing 128 distinct optical states.

3. The method of claim 1, wherein the reduced color state is one of eight distinct colors.

4. The method of claim 3, wherein the eight distinct colors are red, green, blue, cyan, yellow, magenta, white, and black.

5. The method of claim 1, wherein the mapping comprises matching the first optical state and the reduced color state on a look-up-table.

6. The method of claim 1, wherein the providing step is done by a controller.

7. The method of claim 1, wherein the electro-optic medium is an electrophoretic medium.

8. The method of claim 7, wherein the electrophoretic medium includes a reflective white particle and at least one subtractive color particle or a reflective white particle and at least one reflective (non-white) color particle.

9. The method of claim 8, wherein the electrophoretic medium includes a fourth type of electrophoretic particle.

10. The method of claim 9, wherein two of the types of particles are negatively charged and two of the types of particles are positively charged, or wherein one of the types of particles is negatively charged and three of the types of particles are positively charged, or wherein three of the types of particles are negatively charged and one of the types of particles is positively charged.

11. The method of any of claim 10, wherein the electrophoretic medium is encapsulated in microcapsules or microcells.

12. The method of claim 1, wherein the first electrode is a light-transmissive electrode and the second electrode is a pixel electrode of an active matrix of pixel electrodes.

13. The method of claim 1, wherein the voltage sequence is DC balanced.

\* \* \* \* \*